US009868165B2

(12) United States Patent
Behringer

(10) Patent No.: US 9,868,165 B2
(45) Date of Patent: Jan. 16, 2018

(54) WORKPIECE CLAMPING DEVICE, MACHINE TOOL, AND METHOD FOR CLAMPING A WORKPIECE

(71) Applicant: Behringer GmbH, Kirchardt (DE)

(72) Inventor: Christian Behringer, Kirchardt (DE)

(73) Assignee: Behringer GmbH, Kirchardt (DE)

( * ) Notice: Subject to any disclaimer, the term of this patent is extended or adjusted under 35 U.S.C. 154(b) by 202 days.

(21) Appl. No.: 14/995,650

(22) Filed: Jan. 14, 2016

(65) Prior Publication Data

US 2016/0236290 A1 Aug. 18, 2016

Related U.S. Application Data

(63) Continuation of application No. PCT/EP2014/064229, filed on Jul. 3, 2014.

(30) Foreign Application Priority Data

Jul. 18, 2013 (DE) .................. 10 2013 107 661

(51) Int. Cl.
*B23Q 3/08* (2006.01)
*B23D 55/04* (2006.01)
(Continued)

(52) U.S. Cl.
CPC ............. *B23D 55/04* (2013.01); *B23D 53/00* (2013.01); *B23Q 3/066* (2013.01); *B25B 1/18* (2013.01); *F15B 15/2807* (2013.01)

(58) Field of Classification Search
CPC .... B25B 1/00; B25B 1/04; B25B 3/00; B25B 5/00; B25B 5/02
See application file for complete search history.

(56) References Cited

U.S. PATENT DOCUMENTS 4,669,712 A 6/1987 Krause
5,845,897 A 12/1998 Tunkers
(Continued)

FOREIGN PATENT DOCUMENTS

CN 85107494 4/1986
CN 102039535 5/2011
(Continued)

OTHER PUBLICATIONS

International Search Report for corresponding application PCT/EP2014/064229, dated Oct. 6, 2014, 2 pages.

*Primary Examiner* — Lee D Wilson
(74) *Attorney, Agent, or Firm* — Lipsitz & McAllister, LLC

(57) ABSTRACT

A workpiece clamping device for a machine tool is provided, which has a base, first and second clamping jaws between which a workpiece is clampable, a drive, and an actuating element which is displaceable relative to the base and which is coupled to the first clamping jaw. A movement of the actuating element is brought about by the drive and the actuating element brings about a displacement of the first clamping jaw. A transmitter is arranged on the actuating element and is displaceable together with the actuating element and is displaceable relative to the actuating element. A first stop and a spaced-apart second stop are provided, between which stops the transmitter is displaceable together with the actuating element. When the transmitter abuts against the first or second stop, the transmitter is displaceable relative to the actuating element. A sensor is provided for detecting one or more positions of the transmitter.

30 Claims, 10 Drawing Sheets

(51) Int. Cl.
  *B23Q 3/06*  (2006.01)
  *B25B 1/18*  (2006.01)
  *F15B 15/28* (2006.01)
  *B23D 53/00* (2006.01)

(56) References Cited

U.S. PATENT DOCUMENTS

| | | | |
|---|---|---|---|
| 6,220,588 B1* | 4/2001 | Tunkers | B25B 5/061 |
| | | | 269/32 |
| 6,522,953 B1 | 2/2003 | Schneider | |
| 7,263,781 B2 | 9/2007 | Sielemann | |
| 2013/0033010 A1 | 2/2013 | Hiestand | |
| 2013/0296908 A1* | 11/2013 | Schulte | A61B 17/320068 |
| | | | 606/169 |
| 2016/0236290 A1* | 8/2016 | Behringer | B23Q 3/066 |

FOREIGN PATENT DOCUMENTS

| | | |
|---|---|---|
| CN | 102886540 | 1/2013 |
| DE | 2117550 | 10/1972 |
| EP | 0803331 | 10/1997 |
| EP | 0855800 | 7/1998 |
| EP | 1247997 | 10/2002 |
| EP | 1306563 | 5/2003 |
| WO | 00/13855 | 3/2000 |

* cited by examiner

WORKPIECE CLAMPING DEVICE, MACHINE TOOL, AND METHOD FOR CLAMPING A WORKPIECE

This application is a continuation of international application number PCT/EP2014/064229 filed on Jul. 3, 2014 and claims the benefit of German application number 10 2013 107 661.0 filed on Jul. 18, 2013, which are incorporated herein by reference in their entirety and for all purposes.

BACKGROUND OF THE INVENTION

The invention relates to a workpiece clamping device for a machine tool.

The invention furthermore relates to a machine tool, comprising a machine frame, at least one workpiece holder and at least one tool holder.

Furthermore, the invention relates to a method for clamping a workpiece on a workpiece clamping device, in which the workpiece is clamped between a displaceable first clamping jaw and a second clamping jaw.

EP 0 803 331 A1 discloses a toggle lever clamping device for bodywork construction.

EP 1 306 563 A1 discloses a stopping element for mounting on a rod for the formation of an adjustable stop along the rod, wherein the stopping element consists of an annular metal element with an inner surface which is smooth or has a thread.

U.S. Pat. No. 7,263,781 B2 discloses a position measuring instrument for a fluid cylinder.

EP 0 855 800 A1 discloses an inductive end position interrogator.

SUMMARY OF THE INVENTION

In accordance with an embodiment of the invention, a workpiece clamping device is provided, in which a travel can be limited in a structurally simple manner.

In accordance with an embodiment of the invention, the workpiece clamping device comprises:

A base, a first clamping jaw which is displaceable relative to the base, a second clamping jaw, wherein a workpiece is clampable between the first clamping jaw and the second clamping jaw, a drive, an actuating element which is displaceable relative to the base and which is coupled to the first clamping jaw, wherein a displacement movement of the actuating element is brought about by the drive and the actuating element brings about a displacement of the first clamping jaw, a transmitter which is arranged on the actuating element and is displaceable together with the actuating element and is displaceable relative to the actuating element, a first stop and a spaced-apart second stop for the transmitter, between which stops the transmitter is displaceable together with the actuating element, wherein, when the transmitter abuts against the first stop or against the second stop, the transmitter is displaceable relative to the actuating element, and a sensor by means of which one or more positions of the transmitter are detectable.

The position of the transmitter is an indicator of the travel. One or more positions and in particular a defined position of the transmitter relative to the first stop can be reproducibly detected in a simple manner by means of the sensor.

A sensor signal and in particular a switching signal, by means of which the travel can be limited, can be generated in a simple manner.

A limitation of the travel, as the difference between the opening width between the first clamping jaw and the second clamping jaw and a workpiece width, is desirable in order to minimize a risk of crushing for an operator inserting a workpiece to be newly machined.

For example, the travel, according to DIN standard 13898, should not be greater than 6 mm.

In the solution according to the invention, firstly the transmitter can be moved together with the actuating element between two marked positions, namely between the first stop and the second stop by means of the actuating element. Said transmitter, on abutting against the first stop or against the second stop, can be held in a translationally fixed manner since a relative displaceability of the actuating element with respect to the transmitter is basically possible. As a result, in turn, a reliable sensor signal and in particular a switching signal can be generated when the first stop is reached, in order in particular to stop a further movement of the first clamping jaw away from the second clamping jaw.

A reproducible, precise travel limitation is thereby achieved in a simple and reliable manner.

Said travel limitation can be achieved with a structurally simple construction, wherein in particular a clamping operation of the workpiece between the first clamping jaw and the second clamping jaw is minimally affected.

The workpiece clamping device can basically be oriented as desired in space. For example, it can be oriented horizontally or vertically (with respect to the direction of gravity) or else can be oriented between a vertical or horizontal position.

The actuating element is coupled to the first clamping jaw. It is basically possible for the actuating element not to be coupled to the second clamping jaw or to be coupled to the second clamping jaw. In the latter case, the actuating element is configured, for example, as a left-right spindle or comprises such a spindle. A workpiece clamping device of this type is advantageous for clamping round materials.

It is advantageous if the first stop and the second stop are arranged in a translationally fixed manner with respect to the base (wherein a determined adjustability of the position with respect to the base is basically possible). As a result, reference points are set to a certain extent, wherein in particular the first stop is a reference point for limiting the travel. By means of the first stop and the second stop, the transmitter moves reproducibly only in the range between the first stop and the second stop. A high degree of reproducibility of the travel limitation is thereby achieved.

A direction of the spacing between the first stop and the second stop is advantageously parallel to a displacement direction of the actuating element. A travel limitation can thereby be achieved in a structurally simple manner.

In an exemplary embodiment, the first stop and the second stop are formed by inner sides of a housing in which a sensor head of the sensor is arranged. The housing can be used in order to protect the sensor head. Furthermore, the transmitter can be protected as a result. The housing can also be used in order to realize a guide for the actuating element relative to the base. The housing can be closed or can be open on one or more sides.

It is advantageous if the transmitter is positioned in the housing. Said transmitter can thereby be accommodated in a protected manner, and a movement between the first stop and the second stop can be realized in a simple manner.

It is advantageous if the transmitter is seated on the actuating element. As a result, the transmitter can be carried along in a simple manner together with the actuating element for movability between the first stop and the second stop.

It is particularly advantageous if the transmitter has an annular element or is formed by an annular element, wherein the actuating element is passed through an annular opening. As a result, the transmitter can be secured on the actuating element in a simple manner. The securing can be formed in a structurally simple manner such that the transmitter is displaceable together with the actuating element between the first stop and the second stop, that is to say, the transmitter is translationally fixed with respect to the actuating element. It can also be achieved in a simple manner that, on abutting against the first stop or against the second stop, the transmitter is translationally fixed with respect to the base, that is to say the actuating element is basically displaceable relative to the transmitter.

In particular, it is provided that the transmitter is seated in force-locking manner on the actuating element. It can thereby be achieved in a structurally simple manner that the transmitter is carried along by the actuating element for displacement between the first stop and the second stop and, on abutting against the first stop or the second stop, is not carried along, but rather is translationally fixed with respect to the base.

A force-locking securing can be achieved in a simple manner if the transmitter has an elastic element by means of which the transmitter is seated on the actuating element. The elastic element is an adjustment element and in particular an adjustment ring which ensures force-locking securing. By means of the elastic element, an increased (static) frictional force for the force-locking securing can be achieved by increasing the normal force.

In an exemplary embodiment which is simple in terms of manufacturing and construction, the elastic element is an O ring.

The transmitter advantageously has one or more regions, with regard to which the sensor is sensitive. As a result, a defined position or a plurality of defined positions of the transmitter can be detected by the sensor.

In particular, the sensor is a proximity sensor or distance sensor or contact switch. As a result, a position or a plurality of positions and in particular one or more marked positions of the transmitter relative to the sensor can be detected. The sensor can, for example, determine one or more defined positions of the transmitter contactlessly, or a corresponding signal and in particular switching signal can be generated when the transmitter makes mechanical contact with the sensor, which is then formed in particular as a contact switch or microswitch.

In particular, the sensor is a contactless sensor. As a result, a workpiece clamping is minimally affected, for example, by the travel limitation according to the invention.

In an exemplary embodiment, the sensor is an inductive sensor. As a result, for example, the transmitter can be formed in a simple manner as a metal element, wherein in particular one or more marked positions of the transmitter relative to the sensor are detectable in a simple and contactless manner.

In particular, the sensor generates a switching signal when the transmitter reaches the first stop, wherein the first stop is further away from the first clamping jaw than the second stop. The switching signal can be used here in order to stop a further movement of the first clamping jaw away from the second clamping jaw. An effective travel limitation can thereby be achieved.

It is advantageous if a controller is provided which is coupled in terms of signal to the sensor and which activates the drive. A position of the actuating element can thereby be adjusted by means of a sensor signal and in particular a movement of the first clamping jaw away from the second clamping jaw can be stopped if the sensor provides a corresponding signal which indicates that the transmitter is abutting against the first stop.

In particular, the controller stops a movement of the first clamping jaw away from the second clamping jaw when the sensor provides a switching signal indicating that the transmitter has reached the first stop. As a result, an effective travel limitation can be achieved in a simple manner in order in particular to minimize a risk of crushing for an operator.

It is very particularly advantageous if the controller has a travel limiter which limits an opening width between the first clamping jaw and the second clamping jaw, wherein a travel is the opening width minus a workpiece width. As a result, the risk of crushing can be minimized.

In particular, the travel is limited to at most 6 mm in order to meet a relevant DIN standard.

It can be provided that at least one of the variables present is settable to be fixed: (i) position of the first stop; (ii) position of the second stop; (iii) spacing between the first stop and the second stop. The workpiece clamping device can thereby be adapted to different workpiece widths.

It is very particularly advantageous if the first stop is further away from the first clamping jaw than the second stop, wherein, when the first clamping jaw is moved toward the second clamping jaw, the transmitter, carried along together with the actuating element, is first of all displaced in the direction of the second stop until said transmitter abuts against the second stop and then the transmitter is not displaced further relative to the second stop, and, when the first clamping jaw is moved away from the second clamping jaw, the transmitter, carried along together with the actuating element, is displaced in the direction of the first stop until said transmitter abuts against the latter and is not displaced further upon further movement of the actuating element. Movability of the transmitter between the first stop and the second stop is thereby realized, wherein the corresponding movement path is fixed with respect to the base. A movement limitation can be achieved in turn by monitoring by means of the sensor whether the transmitter is abutting against the first stop and then correspondingly providing a signal and in particular switching signal. Said movement limitation can be realized with a relatively low structural outlay and has a high degree of reproducibility.

The drive is, for example, a hydraulic, pneumatic or motorized drive.

In an exemplary embodiment, the drive is a hydraulic pneumatic drive, and the actuating element is part of a piston unit and in particular is a piston rod.

It is very particularly advantageous if a position of the spacing between the first clamping jaw and the second clamping jaw is detectable by the drive. The drive then not only brings about a displacement movement of the actuating element, but also determines a defined position of the actuating element.

In accordance with an embodiment of the invention, a machine tool is provided, in which the at least one workpiece holder is or comprises a workpiece clamping device according to the invention.

In particular, the base is part of the machine frame or is arranged fixedly thereon. This results in a simple structural construction.

In an exemplary embodiment, the machine tool is configured as a sawing machine and in particular a band sawing machine, wherein a tool is a sawing tool and in particular is a saw band. The workpiece clamping device according to the invention can be used effectively in a sawing machine and in particular a band sawing machine.

In accordance with an embodiment of the invention, furthermore a method is provided, in which an effective travel limitation is achieved.

In accordance with an embodiment of the invention, a method is provided in which the workpiece is clamped between a displaceable first clamping jaw and a second clamping jaw, wherein the first clamping jaw is displaced by means of an actuating element, and a transmitter, for which one or more defined positions are sensed by a sensor, is arranged on the actuating element, and in which the transmitter is carried along between a first stop and a second stop by the actuating element, and the transmitter, on abutting against the first stop and on abutting against the second stop, is non-displaceable with respect to a base and is displaceable relative to the actuating element.

The method according to the invention has the advantages already explained in conjunction with the workpiece clamping device according to the invention.

Further advantageous refinements of the method according to the invention have already been explained in conjunction with the workpiece clamping device according to the invention.

In particular, when the transmitter reaches the first stop, wherein the first stop is further away from the first clamping jaw than the second stop, a switching signal is generated by the sensor. Said switching signal can be used to stop a further movement of the first clamping jaw away from the second clamping jaw.

A controller is advantageously provided which, on the basis of the switching signal of the sensor, stops a further movement apart of the first clamping jaw away from the second clamping jaw, in order to limit a travel.

The method according to the invention can be carried out on the workpiece clamping device according to the invention.

The workpiece clamping device according to the invention can be operated with the method according to the invention.

BRIEF DESCRIPTION OF THE DRAWINGS

The description below of preferred embodiments serves for more detailed explanation of the invention in conjunction with the drawings, in which.

DETAILED DESCRIPTION OF THE INVENTION

Figure 1:
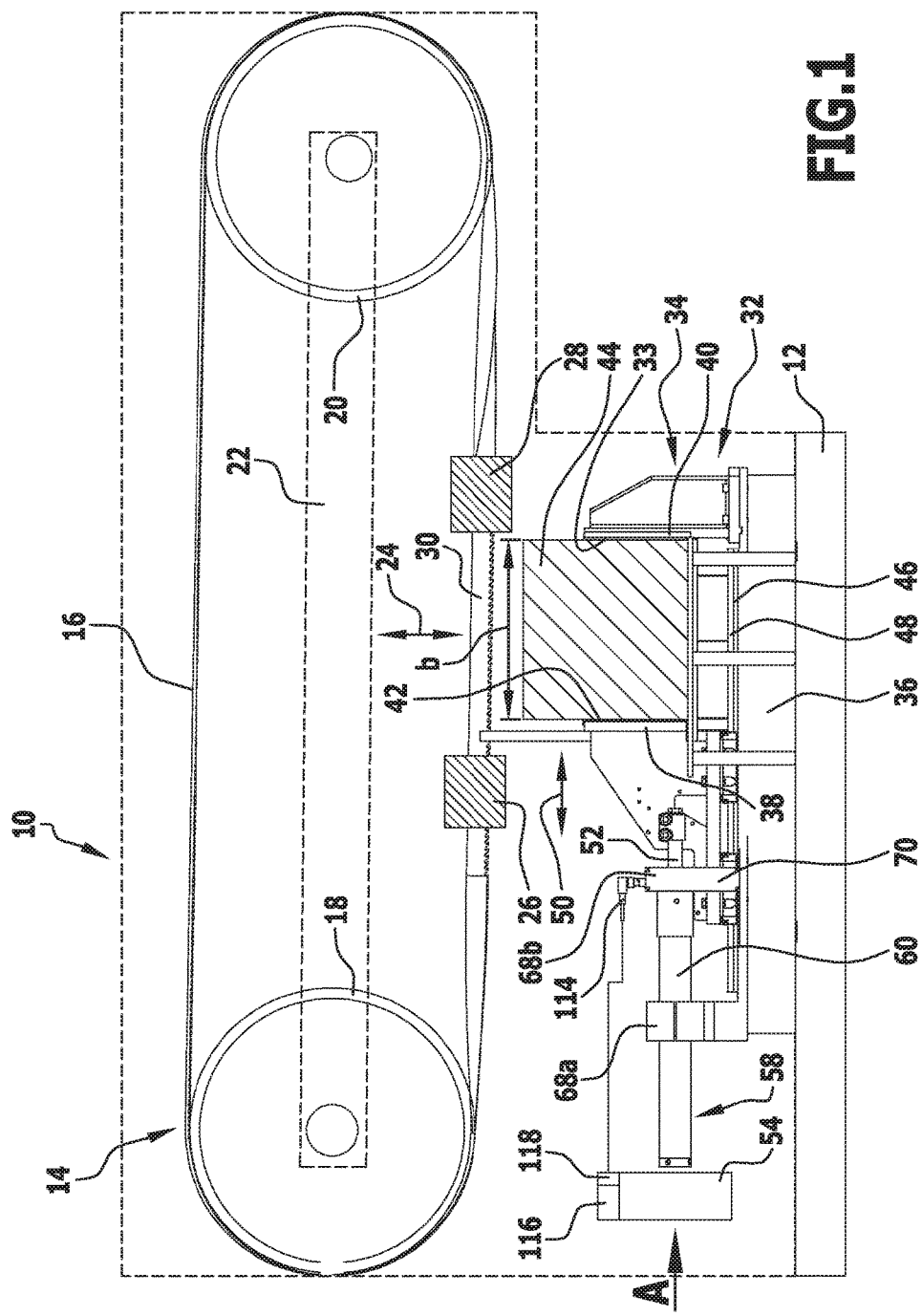
FIG. 1 shows a schematic illustration of a band sawing machine as an exemplary embodiment of a machine tool.
Figure 2:
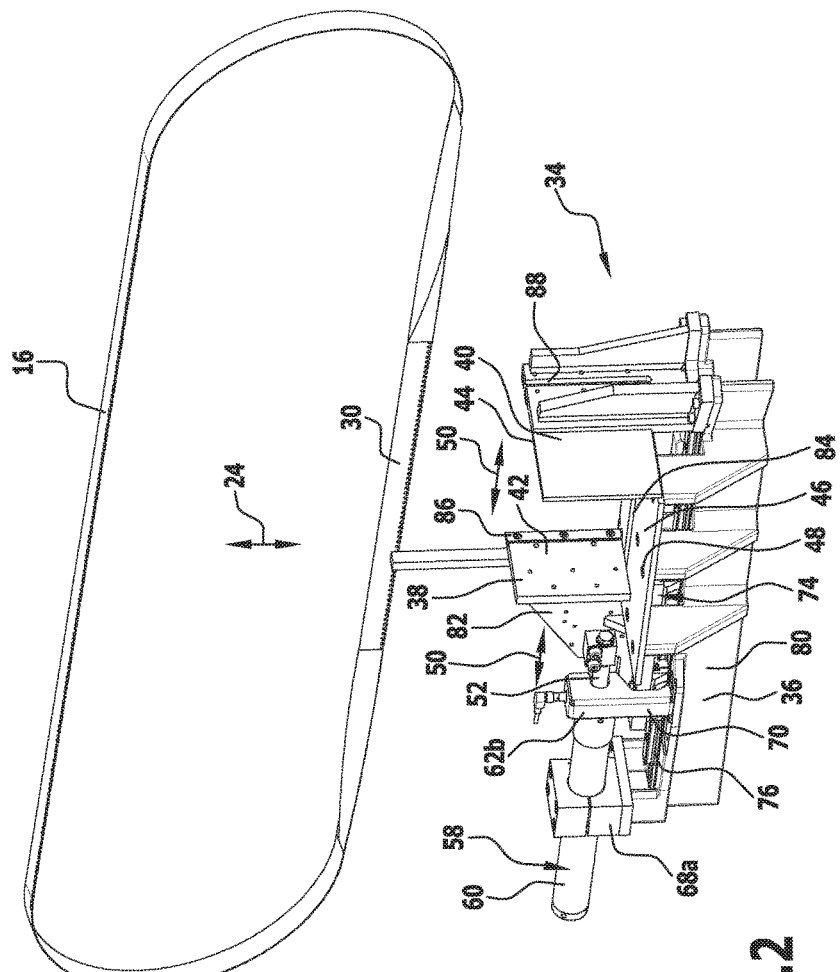
FIG. 2 shows a perspective partial illustration of the machine tool according to FIG. 1.

An exemplary embodiment of a machine tool according to the invention, which is shown schematically in FIG. 1 and is denoted there by 10, is a sawing machine and in particular a band sawing machine. The machine tool 10 comprises a machine frame 12. A tool holder 14 is held on the machine frame 12. In the exemplary embodiment of a band sawing machine, the tool holder 14 holds a saw band 16. In particular, the tool holder 14 comprises a first roller 18 and a spaced-apart second roller 20. The first roller 18 and the second roller 20 hold the endless saw band 16, and the saw band 16 carries out a circulating movement. For this purpose, a corresponding drive (not shown in FIG. 1) is provided.

The first roller 18 and the second roller 20 are held on a carriage 22. Said carriage 22 is vertically movable and in particular vertically displaceable relative to the machine frame 12. A corresponding displacement direction is indicated by the reference sign 24 in FIG. 1.

A first orientation element 26 and a spaced-apart second orientation element 28 are associated with the tool holder 14. Between the first orientation element 26 and the second orientation element 28, a region 30 of the saw band 16 is oriented in such a manner that it can saw through a workpiece 33 during movement toward the machine frame 12.

Furthermore, a workpiece holder 32 is arranged on the machine frame 12. According to the invention, the workpiece holder 32 comprises a workpiece clamping device 34 or is formed as such.

The workpiece clamping device 34 has a base 36 which is fixedly connected to the machine frame 12 or is part of the machine frame 12.

A first clamping jaw 38 is arranged on the base 36. A second clamping jaw 40 which is spaced apart from the first clamping jaw 38 is furthermore provided.

The first clamping jaw 38 has a first clamping face 42. The second clamping jaw 40 has a second clamping face 44. The first clamping face 42 and the second clamping face 44 are in particular planes, wherein the first clamping face 42 and the second clamping face 44 are preferably oriented parallel to each other. The workpiece 33 can be clamped between the first clamping face 42 and the second clamping face 44 in order to secure said workpiece for a machining operation using the saw band 16.

The workpiece clamping device 34 furthermore has a support element 46, onto which the workpiece 33 can be placed for the machining. The support element 46 has a support face 48 which is in particular formed flat.

The first clamping face 42 and the second clamping face 44 are oriented transversely and in particular perpendicularly to the support face 48.

The support element 46 is fixedly connected to the base 36 or is part of the base 36. The second clamping jaw 40 is fixedly connected to the base 36. The first clamping jaw 38 is displaceable in a displacement direction 50 relative to the base 30. The displacement direction 50 lies here in particular transversely with respect to the first clamping face 42 or the second clamping face 44 and lies in particular perpendicularly to the first clamping face 42 or the second clamping face 44. Furthermore, the displacement direction 50 lies in particular parallel to the support face 48.

Figure 7:
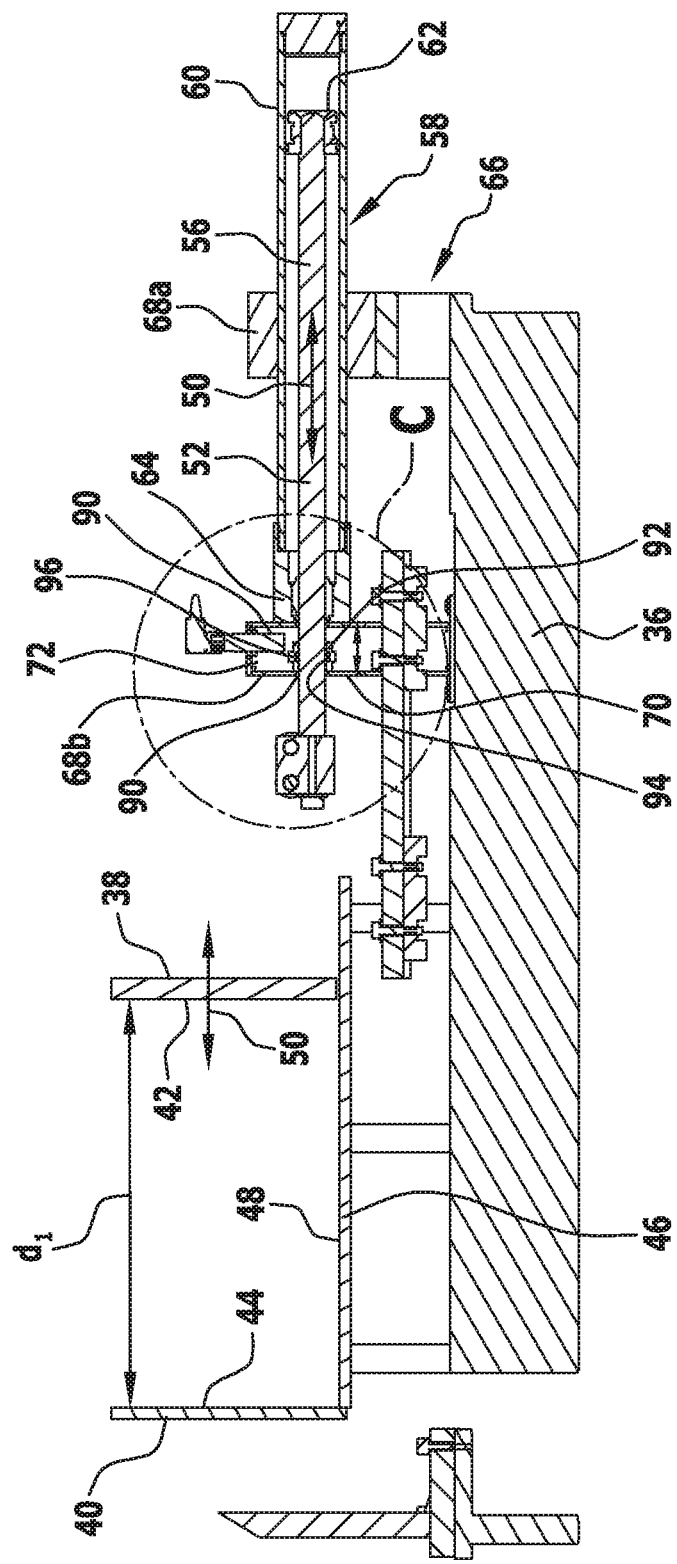
FIG. 7 shows a sectional view along the line 7-7 according to FIG. 5.

By means of the displaceability of the first clamping jaw 38 relative to the second clamping jaw 40, an opening width $d_1$, as the spacing between the first clamping jaw 38 and the second clamping jaw 40, is fixable to a set value (cf., for example, FIG. 7). In particular, by means of appropriate adjustment of the opening width $d_1$ to be greater than a width b of the workpiece 33, the workpiece 33 can be placed into the receiving space between the first clamping jaw 38 and the second clamping jaw 40 and, by means of appropriate reduction in the opening width $d_1$, the workpiece 33 can then be clamped in the receiving space between the first clamping jaw 38 and the second clamping jaw 40 with support on the support face 48 and can thereby secured for a subsequent machining of the workpiece.

An actuating element 52 is secured on the first clamping jaw 38. The actuating element 52 is displaceable in the displacement direction 50 and in particular is linearly displaceable.

A drive 54 is associated with actuating element 52. The drive 54 is spaced apart from the first clamping jaw 38, and the actuating element 52 ensures that force is transmitted from the drive 54 to the first clamping jaw 38.

Said drive 54 brings about a displacement actuation of the actuating element 52, wherein a displacement position of the actuating element 52 is also adjustable and determinable by means of the drive 54. As a result, in particular a clamping position of the first clamping jaw 38 for the clamping securing of a workpiece 33 between the first clamping jaw 38 and the second clamping jaw 40 for machining the workpiece can be determined.

In an exemplary embodiment, the actuating element 52 is a rod or spindle 56 (cf., for example, FIG. 7) of a piston unit 58. The piston unit 58 comprises a cylinder 60 in which a piston 62 is arranged. The spindle 56 is seated as a piston rod on the piston 62 in turn.

The drive 54 is a hydraulic drive, wherein, by means of corresponding hydraulic action upon the piston 62 in the cylinder 60, a linear displacement movement and displacement position of the actuating element 52, and therefore of the first clamping jaw 38, is adjustable.

For this purpose, the piston unit 58 has a corresponding displacement bearing device 64 for the spindle 56.

A holding device 66 which holds the cylinder 60 in a translationally fixed manner on the base 36 is held on the base 36.

In a first exemplary embodiment, the holding device 66 comprises a first holding element 68a and a spaced-apart second holding element 68b, which holding elements are secured on the base 36. The cylinder 60 is secured at a vertical spacing from the base 36 by means of said holding elements. The actuating element 52 is then displaceable at a vertical spacing from the base 36 relative to the base 36 in the displacement direction 50 (which is also the displacement direction of the first clamping jaw 38).

The second holding element 68b is formed as a housing 70. Said housing 70 has an interior space 72 which is partially or completely closed.

It is also possible that the drive 54 is, for example, a pneumatic drive or a motorized drive or an electric motor drive. The drive 54 brings about a displacement movement and a detecting of the position of the actuating element 52 and therefore of the first clamping jaw 38.

Figure 3:
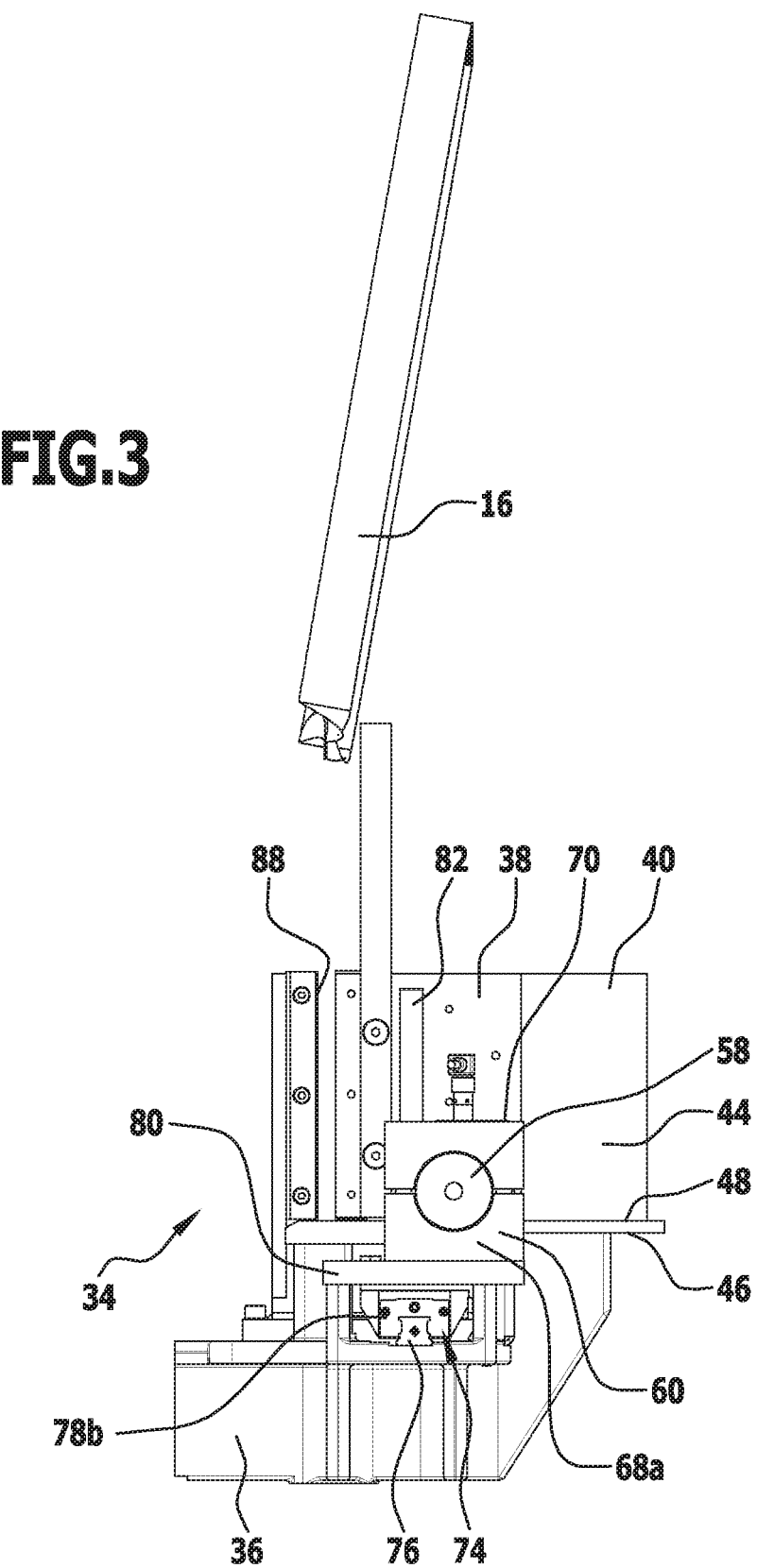
FIG. 3 shows a view of the machine tool according to FIG. 1 in the direction A.
Figure 4:
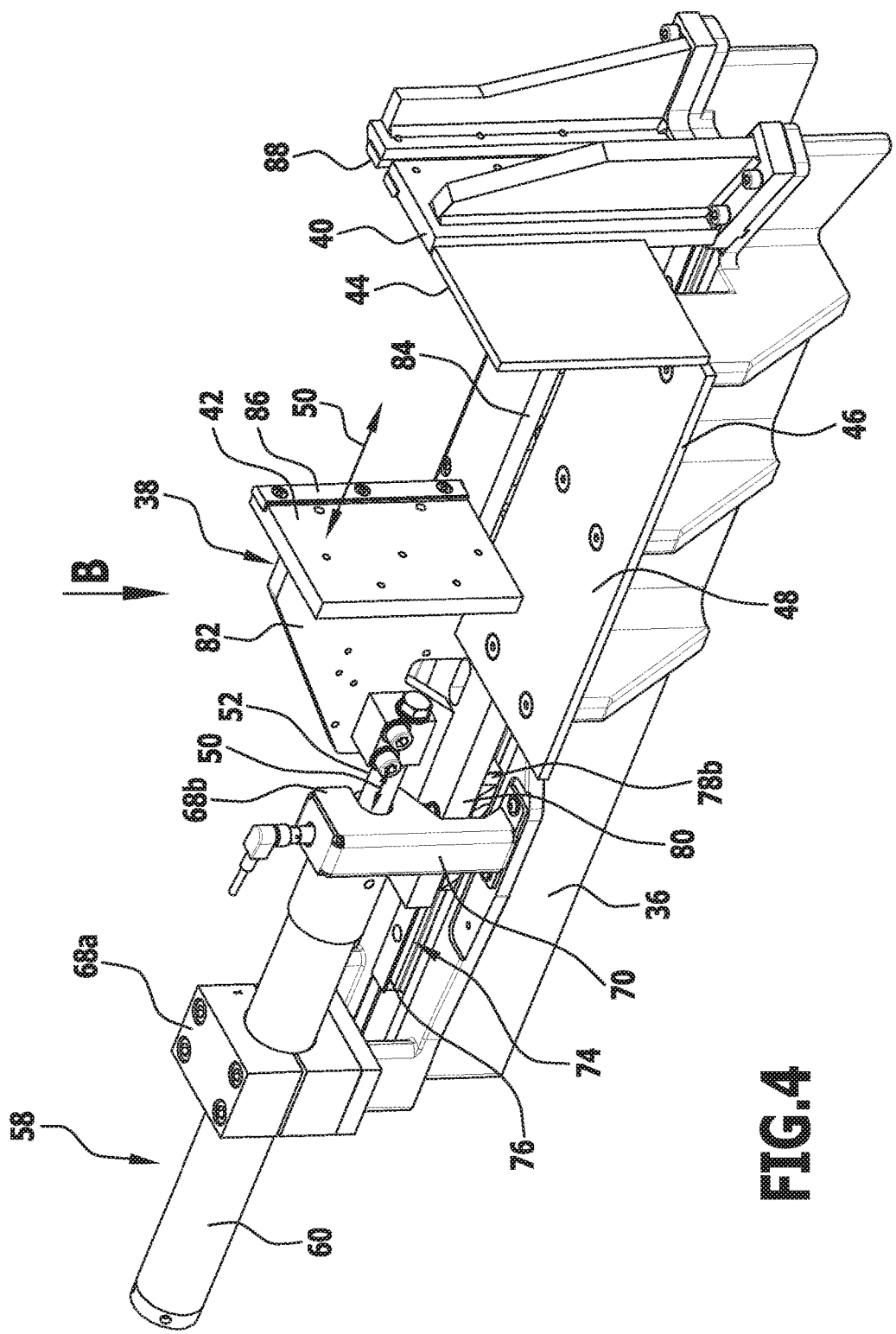
FIG. 4 shows a perspective illustration of an exemplary embodiment of a workpiece clamping device.
Figure 5:
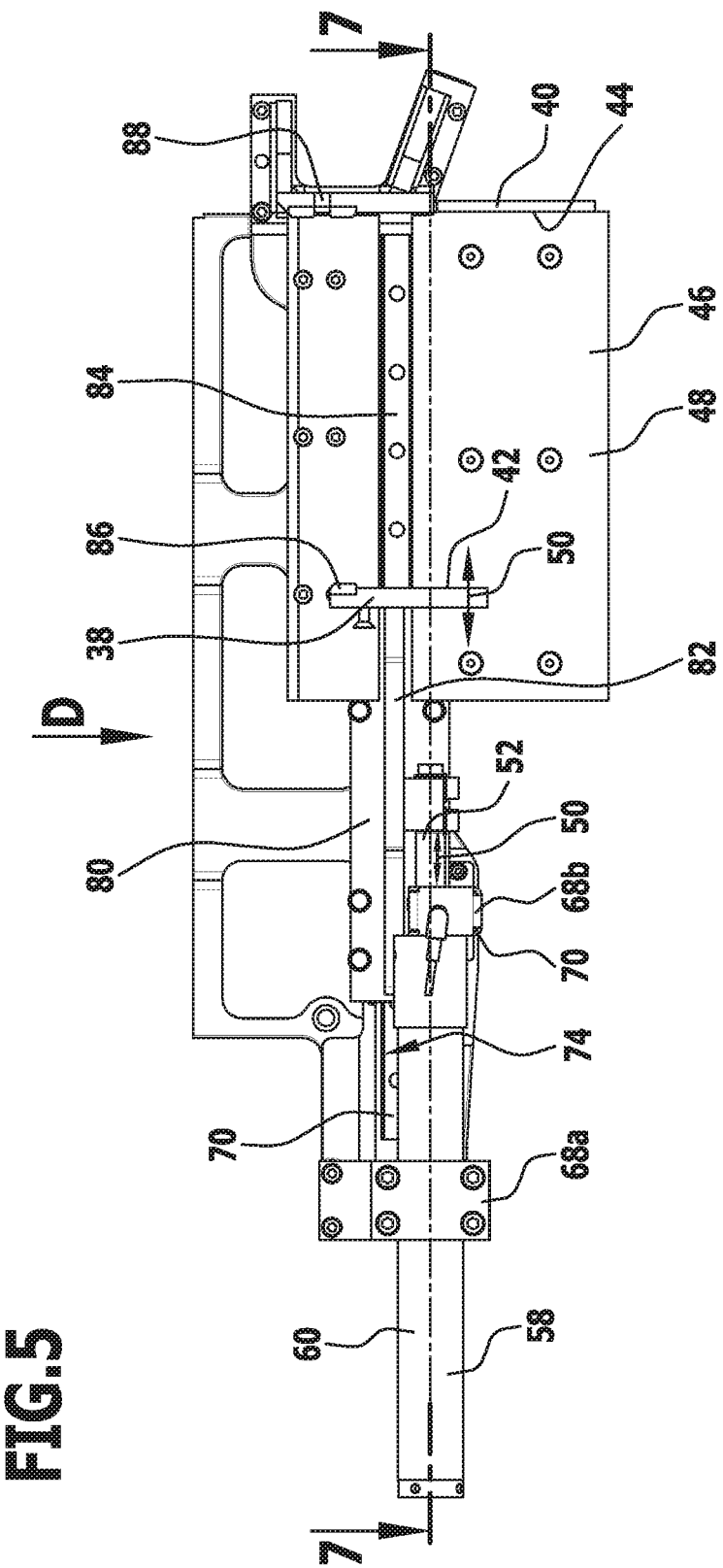
FIG. 5 shows a view of the workpiece clamping device according to FIG. 4 in the direction B (top view)
Figure 6:
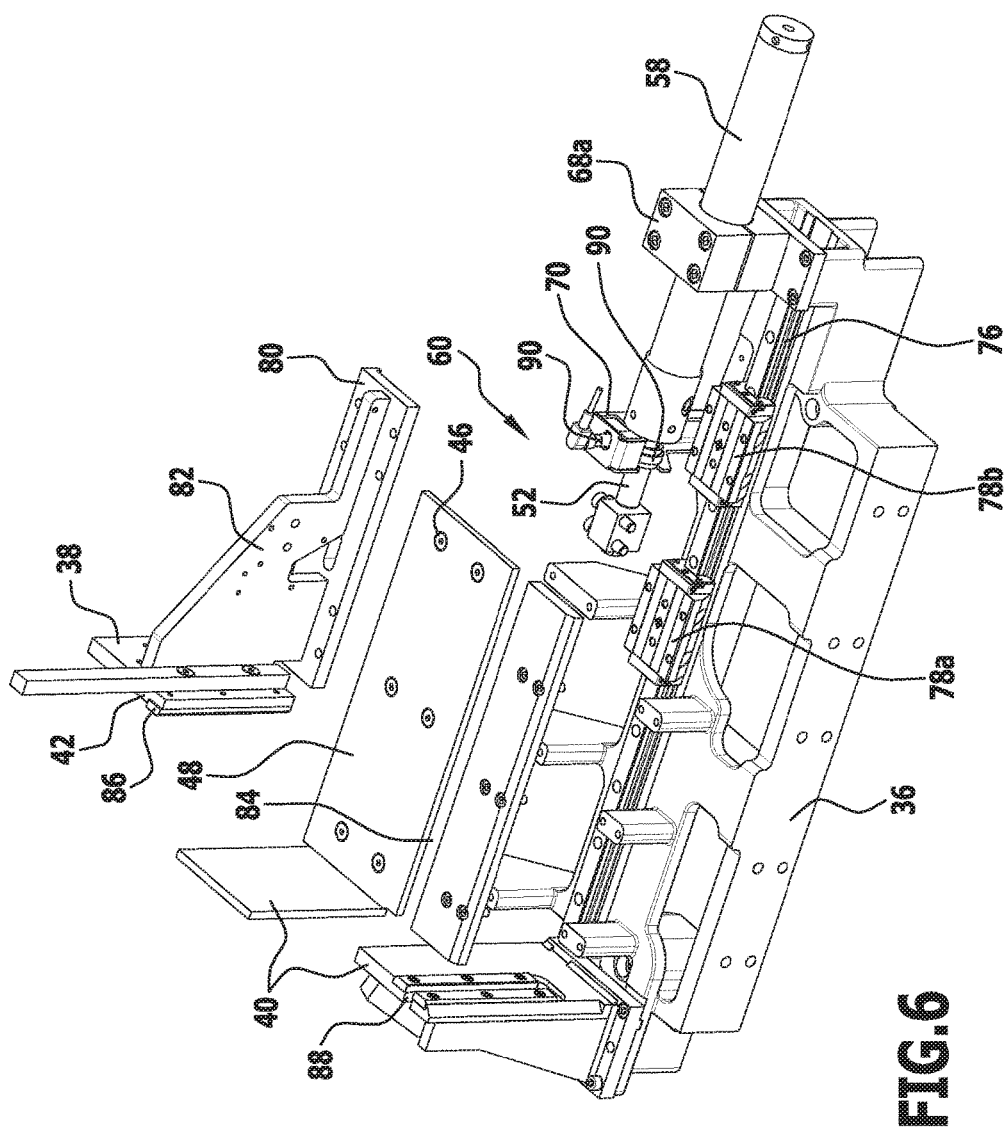
FIG. 6 shows an exploded illustration of the workpiece clamping device according to FIG. 4.

A guiding device 74 is associated with the first clamping jaw 38 (cf., for example, FIG. 3).

The guiding device 74 is formed in particular as a sliding guide.

In an exemplary embodiment, the guiding device 74 comprises a strip 76 which is arranged on the base 36.

One or more sliding parts are seated on said strip 76. In the exemplary embodiment shown, spaced-apart sliding blocks 78a, 78b are seated on the strip 76.

The first clamping jaw 38 has a holding plate 80. The sliding blocks 78a, 78b are secured on the holding plate 80.

The sliding blocks 78a, 78b are located here below the actuating element 52, in particular with reference to a vertical direction of the base 36.

A strut 82 which, for example, has a trapezoidal shape is arranged on the holding plate 80. A corresponding element with the first clamping face 42 is seated in turn on the strut 82.

The strut 82 has the form of a plate, wherein said strut is oriented transversely with respect to the first clamping face 42.

A continuous groove 84 is formed in the support element 46. The strut 82 is passed through the groove 84, and therefore the first clamping face 42 is located above the support face 48. The holding plate 80 is positioned below the support element 46.

The first clamping face 42 has such a width that said clamping face is spaced apart from the saw band 16 when the latter is moved in the direction 24 toward the machine frame 12 in order to saw through the workpiece 33.

It can be provided here that a guide strip 86, along which the saw band 16 is slideable by an outer side, is arranged on the first clamping jaw 38.

In an exemplary embodiment, the second clamping jaw 40 has a continuous groove 88 which is oriented transversely and in particular perpendicularly with respect to the groove 84. The saw band 16 is configured to pass through said groove 88.

In the interior space 72 of the housing 70, a transmitter 90 is seated on the actuating element 52 (cf. FIGS. 6 to 10). The transmitter 90 is formed in particular as an annular element 92, with an annular opening 94. The annular opening 94 is adapted in the geometrical shape thereof to the geometrical shape of the actuating element 52.

For example, the annular opening 94 is circular in cross section if the actuating opening 52 has a cylindrical external shape at least in the region in which the transmitter 90 is seated.

The actuating element 52 is passed through the annular opening 94, and the transmitter 90 is seated on the actuating element 52.

The transmitter 90 furthermore comprises an adjustment element 96 which is formed in particular as an adjustment ring.

In an exemplary embodiment, the annular element 92 has a groove 98 with respect to the annular opening 94.

In an exemplary embodiment, the groove 98 is an annular groove.

The adjustment element 96 and in particular an adjustment ring is seated in said groove 98.

The adjustment element 96 is in particular an elastic element. For example, the adjustment element 96 is formed by an O ring.

By means of the adjustment element 96, the transmitter 90 is seated in force-locking manner on the actuating element 52 in such a manner that, firstly, the transmitter 90 is carried along together with the actuating element 52 during a movement of the latter and a displaceability takes place in the displacement direction 50 of the transmitter 90, and, secondly, as is described in more detail below, under certain conditions the transmitter 90 is fixable relative to the base 36 and then a relative displacement of the actuating element 52 with respect to the transmitter 90 can take place.

Figure 8:
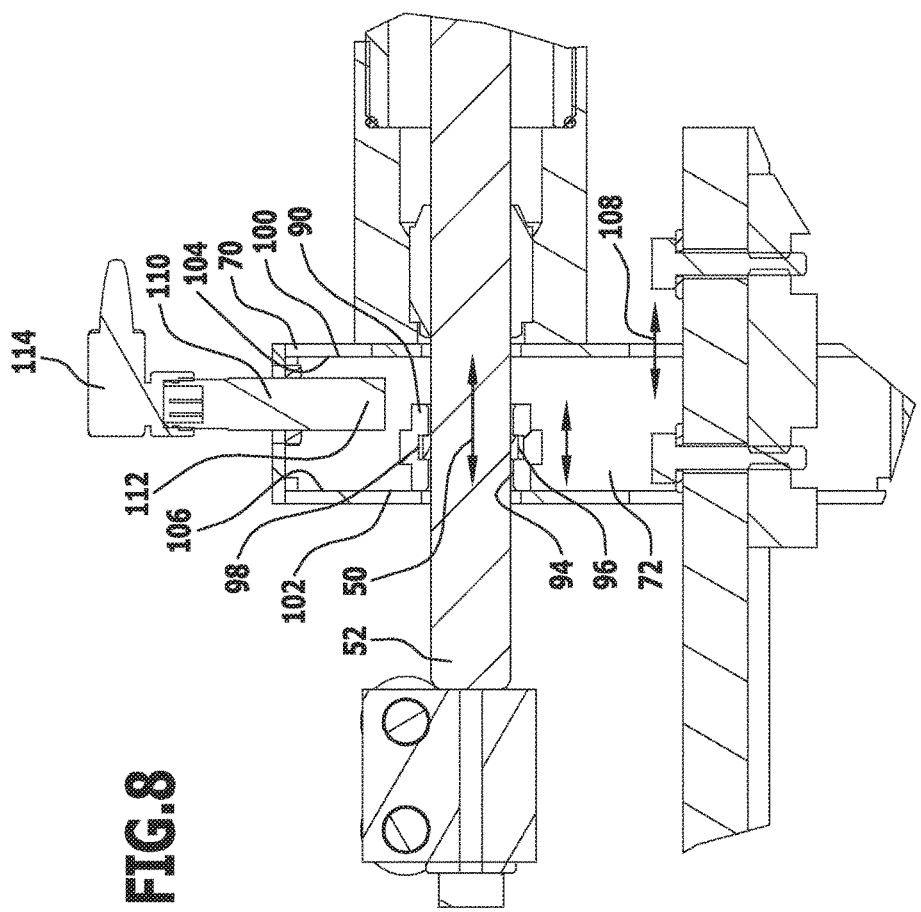
FIG. 8 shows an enlarged illustration of the region C in FIG. 7.

The workpiece clamping device 34 has a first stop 100 and a spaced-apart second stop 102 for the transmitter 90 (cf., for example, FIG. 8). The first stop 100 is further away from the first clamping jaw 38 than the second stop 102. A direction of the spacing between the first stop 100 and the second stop 102 lies parallel to the displacement direction 50 of the actuating element 52.

In an exemplary embodiment, the first stop 100 is formed by a first inner side 104 of the housing 70. The second stop 102 is formed by an opposite second inner side 106 of the housing 70.

The transmitter 90 is displaceable between the first stop 100 and the second stop 102.

The first stop 100 and the second stop 102 are translationally fixed with respect to the base 36.

In an exemplary embodiment, the first stop 100 and/or the second stop 102 are fixable in adjusted positions in the displacement direction 50 relative to the base 36. This is indicated in FIG. 8 by the arrow with the reference sign 108. As a result, in particular, the spacing between the first stop 100 and the second stop 102 is fixable to a set value. Provision is made here for the first stop 100 and the second stop 102 to be secured in a translationally fixed manner with respect to the base 36 during a workpiece clamping operation on the workpiece clamping device 34.

It is basically also possible for the first stop 100 and the second stop 102 to be arranged non-adjustably fixed with respect to the base 36.

A sensor 110 is associated with the transmitter 90. Said sensor 110 is at least partially arranged in the interior space 72 of the housing 70. In particular, a sensor head 112, which comprises one or more elements which are sensitive with respect to the transmitter 90, is arranged in a protected manner in the interior space 72 of the housing 70.

The sensor 110 senses one or more defined positions of the transmitter 90.

For example, the sensor head 112 is configured as a contactless proximity sensor or distance sensor.

In an exemplary embodiment, the sensor 110 is configured as a switching sensor which delivers a switching signal when the transmitter 70 abuts against the first stop 100.

The sensor 110 can also be configured, for example, as a contact switch (microswitch) which generates a switching signal upon contact with the transmitter 90.

There is associated with the sensor 110 a connection device 114, by means of which the sensor is suppliable with electrical energy. Furthermore, a sensor signal can be tapped off by the sensor 110 via the connection device 114.

The sensor 110 is connected in terms of signal to a controller 116. The controller 116 is in particular part of the control of the machine tool 10. The controller 116 controls the drive 54 and therefore the movement and position of the actuating element 52 and therefore, in turn, the movement and position of the first clamping jaw 38.

The controller 116 comprises a travel limiter 118, by means of which, as is explained in more detail below, a travel of the first clamping jaw 38 is limited. The travel $d_2$ here is the difference between the opening width $d_1$ of the first clamping jaw 38 with respect to the second clamping jaw 40 minus the width b of the workpiece 33.

The workpiece clamping device 34 functions as follows:

In order to place the workpiece 33 into the receiving space between the first clamping jaw 38 and the second clamping jaw 40 on the support element 46, the opening width $d_1$ has to be adjusted in such a manner that said opening width is larger than the width b of the workpiece 33. For this purpose, the first clamping jaw 38 has to be correspondingly moved away from the second clamping jaw 40. This movement away is brought about by the drive 54, wherein said drive acts on the first clamping jaw 38 via the actuating element 52.

Figure 9:
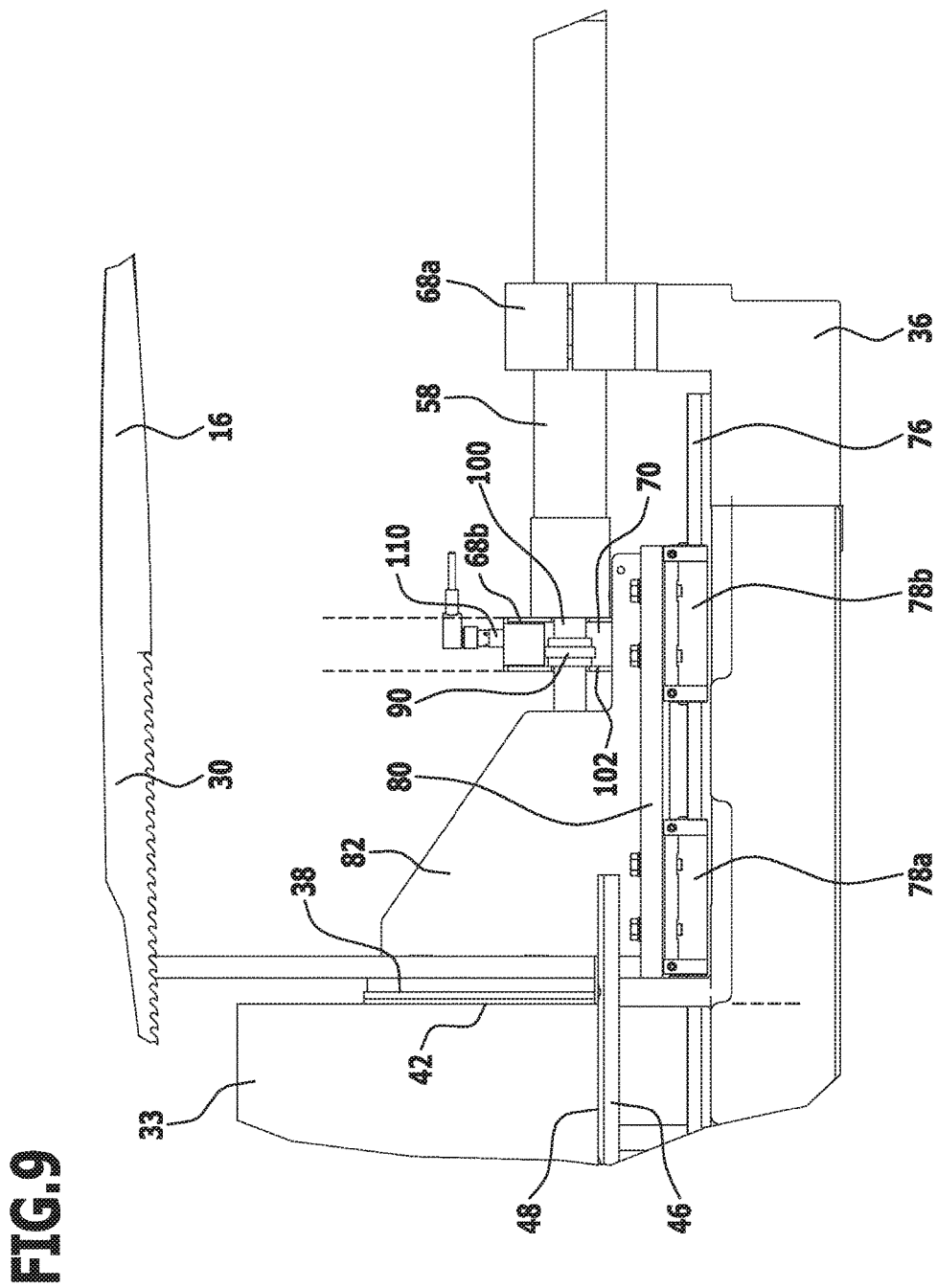
FIG. 9 shows an enlarged partial view of the workpiece clamping device in the direction D according to FIG. 5 in a first position of an actuating element.

FIG. 9 shows an initial position for the transmitter 90, in which the latter abuts against the second stop 102 (cf. also FIG. 8). Said starting position is, for example, a position in which a workpiece has been secured and the workpiece machined previously. In order to remove the machined workpiece from the machine tool 10 and in order to insert a new workpiece 33 to be machined, the first clamping jaw 38 is correspondingly moved away from the second clamping jaw 40.

Figure 10:
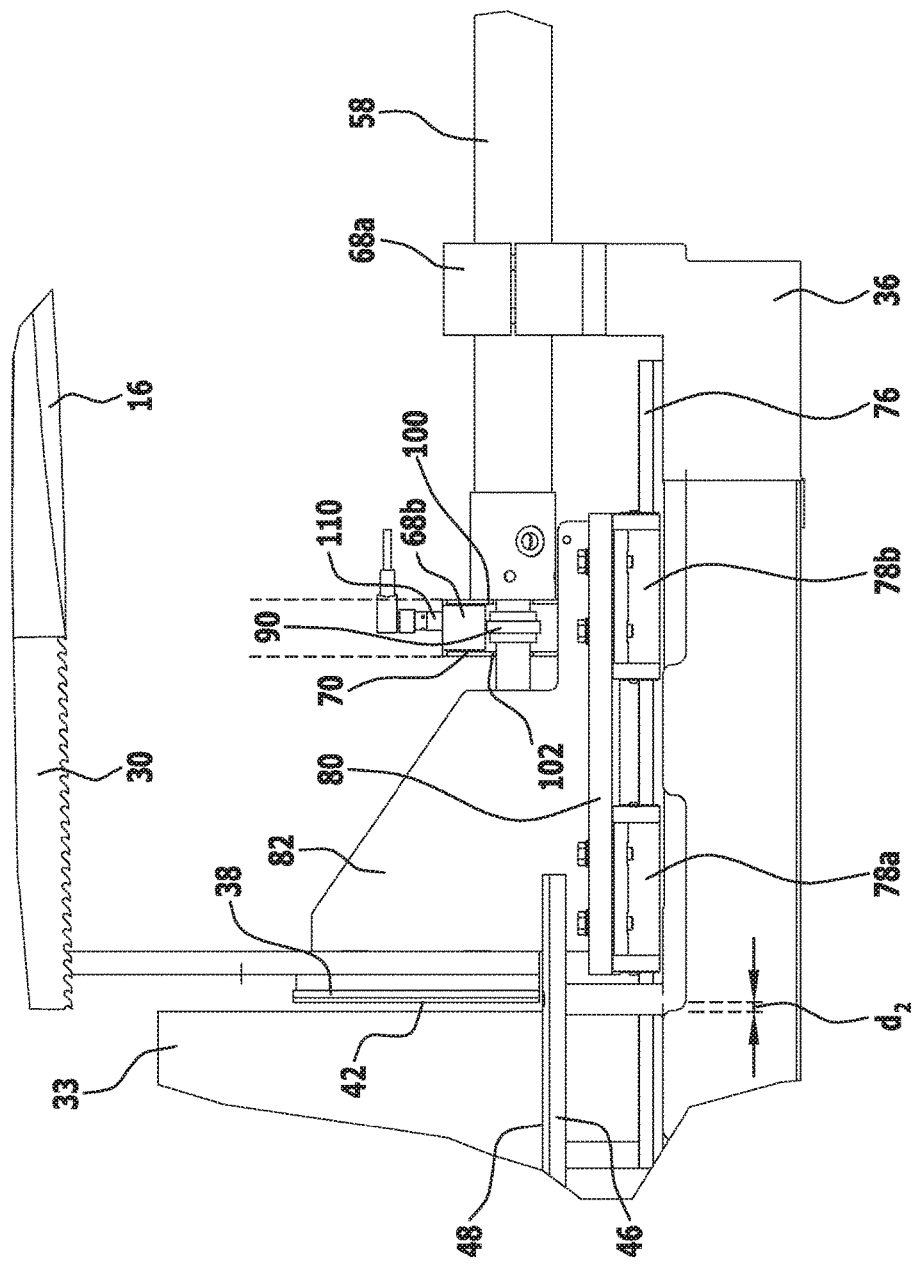
FIG. 10 shows the same view as in FIG. 9 with a different position of the actuating element.

During this movement, the transmitter 90 is moved from the second stop 102 in the direction of the first stop 100. A corresponding intermediate position in said movement is shown in FIG. 10.

The transmitter 90 is carried along here by the actuating element 52 until said transmitter reaches the first stop 100. The force-locking securing of the transmitter 90 on the actuating element 52 brings about a translational carrying along of the transmitter 90 by the actuating element 52.

When the transmitter 90 reaches the first stop 100 and abuts there, a further movement of the actuating element 52 is then brought about in a direction in which the opening width $d_1$ between the first clamping jaw 38 and the second clamping jaw 40 is increased further such that the transmitter 90 is immobilized with respect to the base 36, i.e. is no longer displaced further, and the actuating element 52 is then displaced relative to the transmitter 90.

The sensor 110 and the transmitter 90 are adapted to each other in such a manner that the sensor 110 delivers a corresponding signal when the transmitter 90 reaches the first stop 100. Said signal is in particular a switching signal which is transmitted to the controller 116 and, in the process, in particular to the travel limiter 118. Said switching signal causes the controller 116 to control the drive 54 in such a manner that the displacement of the actuating element 52 is stopped with the movement of the first clamping jaw 38 away from the second clamping jaw 40. The travel $d_2$ is thereby limited.

In particular, the travel $d_2$ is limited to a distance of at most 6 mm. A safety function as required, for example, by DIN 13898 is thereby realized. The risk of crushing for an operator who is inserting a workpiece 33 to be newly machined is thereby minimized since it is ensured that travels cannot occur above a certain threshold, for example 6 mm.

During this management of the operation, the transmitter 90 is pushed away from the second stop 102 when the opening width $d_1$ is increased until said transmitter reaches the first stop 100. A further displacement of the actuating element 52 is then switched off. As shown in FIG. 10, the travel $d_2$ can thereby be limited in a simple manner.

After the workpiece 33 to be newly machined is inserted, the first clamping jaw 38 is moved again in the direction of the second clamping jaw 40 in order to clamp the workpiece 33 between the first clamping jaw 38 and the second clamping jaw 40 for a subsequent machining.

During this advancing movement, the transmitter 90, because of the force-locking coupling to the actuating element 52, moves together with the actuating element 52 away from the first stop 100 as far as the second stop 102. When the second stop 102 is reached and the transmitter 90 abuts against the second stop 102, the actuating element 52 can then be displaced further with respect to the transmitter 90; the transmitter 90 is then located in a translationally fixed manner with respect to the base 36. The clamping of the workpiece 33 then takes place.

A subsequent machining with the saw band 16 can then take place by said saw band being moved in particular in the direction 24 together with the carriage 22 toward the workpiece 33 and a cut being made in the workpiece 33 and in particular the workpiece 33 being sawn through.

By means of the workpiece clamping device 34 according to the invention, an effective movement limitation is achieved with a simple structural design in order to minimize the risk of crushing in particular when inserting a new workpiece 33 to be machined. In particular, a limitation of the travel $d_2$ to, for example, at most 6 mm can be achieved in a simple and effective manner.

LIST OF REFERENCE SIGNS

10 Machine tool
12 Machine frame
14 Tool holder
16 Saw band
18 First roller
20 Second roller
22 Carriage
24 Displacement direction
26 First orientation element
28 Second orientation element
30 Region
32 Workpiece holder
33 Workpiece
34 Workpiece clamping device
36 Base
38 First clamping jaw
40 Second clamping jaw
42 First clamping face
44 Second clamping face
46 Support element
48 Support face
50 Displacement direction
52 Actuating element
54 Drive
56 Spindle
58 Piston unit
60 Cylinder
62 Piston
64 Displacement bearing device
66 Holding device
68a First holding element
68b Second holding element
70 Housing
72 Interior space
74 Guiding device
76 Strip
78a Sliding block
78b Sliding block
80 Holding plate
82 Strut
84 Groove
86 Guide strip
88 Groove
90 Transmitter
92 Annular element
94 Annular opening
96 Adjustment element
98 Groove
100 First stop
102 Second stop
104 First inner side
106 Second inner side
108 Arrow
110 Sensor
112 Sensor head
114 Connection device
116 Controller
118 Travel limiter

The invention claimed is:

1. A workpiece clamping device for a machine tool, comprising
   a base,
   a first clamping jaw which is displaceable relative to the base,
   a second clamping jaw,
   wherein a workpiece is clampable between the first clamping jaw and the second clamping jaw,
   a drive,
   an actuating element which is displaceable relative to the base and which is coupled to the first clamping jaw,
   wherein a displacement movement of the actuating element is brought about by the drive and the actuating element brings about a displacement of the first clamping jaw,
   a transmitter which is arranged on the actuating element and is displaceable together with the actuating element and is displaceable relative to the actuating element,
   a first stop and a spaced-apart second stop for the transmitter, between which stops the transmitter is displaceable together with the actuating element,
   wherein, when the transmitter abuts against the first stop or against the second stop, the transmitter is displaceable relative to the actuating element, and
   a sensor by means of which one or more positions of the transmitter are detectable.

2. The workpiece clamping device as claimed in claim 1, wherein the first stop and the second stop are arranged in a translationally fixed manner with respect to the base.

3. The workpiece clamping device as claimed in claim 1, wherein a direction of the spacing between the first stop and the second stop is parallel to a displacement spacing of the actuating element.

4. The workpiece clamping device as claimed in claim 1, wherein the first stop and the second stop are formed by inner sides of a housing in which a sensor head of the sensor is arranged.

5. The workpiece clamping device as claimed in claim 4, wherein the transmitter is positioned in the housing.

6. The workpiece clamping device as claimed in claim 1, wherein the transmitter is seated on the actuating element.

7. The workpiece clamping device as claimed in claim 6, wherein the transmitter has an annular element or is formed by an annular element, wherein the actuating element is passed through an annular opening.

8. The workpiece clamping device as claimed in claim 1, wherein the transmitter is seated in force-locking manner on the actuating element.

9. The workpiece clamping device as claimed in claim 8, wherein the transmitter has an elastic element by means of which the transmitter is seated on the actuating element.

10. The workpiece clamping device as claimed in claim 9, wherein the elastic element is an O ring.

11. The workpiece clamping device as claimed in claim 1, wherein the transmitter has one or more regions, with respect to which the sensor is sensitive.

12. The workpiece clamping device as claimed in claim 1, wherein the sensor is a proximity sensor or distance sensor or contact switch.

13. The workpiece clamping device as claimed in claim 1, wherein the sensor is a contactless sensor.

14. The workpiece clamping device as claimed in claim 1, wherein the sensor is an inductive sensor.

15. The workpiece clamping device as claimed in claim 1, wherein the sensor generates a switching signal when the transmitter reaches the first stop, wherein the first stop is further away from the first clamping jaw than the second stop.

16. The workpiece clamping device as claimed in claim 1, wherein a controller is provided which is coupled in terms of signal to the sensor and which controls the drive.

17. The workpiece clamping device as claimed in claim 16, wherein the controller stops a movement of the first clamping jaw away from the second clamping jaw when the sensor provides a switching signal indicating that the transmitter has reached the first stop.

18. The workpiece clamping device as claimed in claim 16, wherein the controller has a travel limiter which limits an opening width ($d_1$) between the first clamping jaw and the second clamping jaw, wherein a travel ($d_2$) is the opening width ($d_1$) minus a workpiece width (b).

19. The workpiece clamping device as claimed in claim 18, wherein the travel ($d_2$) is limited to at most 6 mm.

20. The workpiece clamping device as claimed in claim 1, wherein at least one of the variables present is settable to be fixed:
 (i) position of the first stop;
 (ii) position of the second stop;
 (iii) spacing between the first stop and the second stop.

21. The workpiece clamping device as claimed in claim 1, wherein the first stop is further away from the first clamping jaw than the second stop, wherein, when the first clamping jaw is moved toward the second clamping jaw, the transmitter, carried along together with the actuating element, is first of all displaced in the direction of the second stop until said transmitter abuts against the second stop and then the transmitter is not displaced further relative to the second stop, and, when the first clamping jaw is moved away from the second clamping jaw, the transmitter, carried along together with the actuating element, is displaced in the direction of the first stop until said transmitter abuts against the latter and is not displaced further upon further movement of the actuating element.

22. The workpiece clamping device as claimed in claim 1, wherein the drive is a hydraulic, pneumatic or motorized drive.

23. The workpiece clamping device as claimed in claim 1, wherein the actuating element is part of a piston unit and in particular is a piston rod.

24. The workpiece clamping device as claimed in claim 23, wherein a position of the spacing between the first clamping jaw and the second clamping jaw is detectable by the drive.

25. A machine tool, comprising
a machine frame,
at least one workpiece holder, and
at least one tool holder,
wherein the at least one workpiece holder is or comprises a workpiece clamping device, said workpiece clamping device comprising
a base,
a first clamping jaw which is displaceable relative to the base,
a second clamping jaw,
wherein a workpiece is clampable between the first clamping jaw and the second clamping jaw,
a drive,
an actuating element which is displaceable relative to the base and which is coupled to the first clamping jaw, wherein a displacement movement of the actuating element is brought about by the drive and the actuating element brings about a displacement of the first clamping jaw,
a transmitter which is arranged on the actuating element and is displaceable together with the actuating element and is displaceable relative to the actuating element,
a first stop and a spaced-apart second stop for the transmitter, between which stops the transmitter is displaceable together with the actuating element,
wherein, when the transmitter abuts against the first stop or against the second stop, the transmitter is displaceable relative to the actuating element, and
a sensor by means of which one or more positions of the transmitter are detectable.

26. The machine tool as claimed in claim 25, wherein the base is part of the machine frame or is arranged fixedly thereon.

27. The machine tool as claimed in claim 25, said machine tool being configured as a sawing machine and in particular a band sawing machine, wherein a tool is a sawing tool and in particular is a saw band.

28. A method for clamping a workpiece on a workpiece clamping device, in which the workpiece is clamped between a displaceable first clamping jaw and a second clamping jaw, wherein the first clamping jaw is displaced by means of an actuating element, and a transmitter, for which one or more defined positions are sensed by a sensor, is arranged on the actuating element, and in which the transmitter is carried along between a first stop and a second stop by the actuating element, and the transmitter, on abutting against the first stop and on abutting against the second stop, is non-displaceable with respect to a base and is displaceable relative to the actuating element.

29. The method as claimed in claim 28, wherein, when the transmitter reaches the first stop, wherein the first stop is further away from the first clamping jaw than the second stop, the sensor generates a switching signal.

30. The method as claimed in claim 29, wherein, on the basis of the switching signal of the sensor, a controller stops a further movement apart of the first clamping jaw away from the second clamping jaw, in order to limit a travel ($d_2$).

\* \* \* \* \*